United States Patent
Kuehnel et al.

(10) Patent No.: US 6,759,773 B1
(45) Date of Patent: Jul. 6, 2004

(54) ELECTRONICALLY CONTROLLED ELECTRIC MOTOR PROVIDED FOR USE IN AN ENVIRONMENT CONTAINING SOLVENTS

(75) Inventors: Frank Kuehnel, Eschborn (DE); Wolfgang Warnke, Herleshausen (DE)

(73) Assignee: Siemens AG (DE)

( * ) Notice: Subject to any disclaimer, the term of this patent is extended or adjusted under 35 U.S.C. 154(b) by 0 days.

(21) Appl. No.: 09/719,594

(22) PCT Filed: Mar. 22, 2000

(86) PCT No.: PCT/EP00/02509

§ 371 (c)(1),
(2), (4) Date: Mar. 9, 2001

(87) PCT Pub. No.: WO00/62405

PCT Pub. Date: Oct. 19, 2000

(30) Foreign Application Priority Data

Apr. 13, 1999 (DE) .......................... 199 16 528

(51) Int. Cl.[7] .......................... H02K 11/00; H02K 5/10; H02K 5/12; H02K 21/12

(52) U.S. Cl. .................. 310/68 B; 310/87; 310/156.05; 310/156.06

(58) Field of Search .............................. 324/200–243, 324/207.15, 207.25, 174; 310/68 B, 156.05, 156.06, 156.64, 156.81, 156.53, 156.54, 156.55, 156.56, 156.38, 268, 87; 73/861.78, 861.11

(56) References Cited

U.S. PATENT DOCUMENTS

| | | | | |
|---|---|---|---|---|
| 2,545,422 A | * | 3/1951 | Blom | 417/414 |
| 3,761,750 A | * | 9/1973 | Green | 310/87 |
| 3,764,233 A | * | 10/1973 | Strickland | 417/414 |
| 3,770,635 A | * | 11/1973 | Atendido | 508/469 |
| 4,065,706 A | | 12/1977 | Gosling et al. | |
| 4,259,603 A | * | 3/1981 | Uchiyama et al. | 310/156.21 |
| 4,260,920 A | * | 4/1981 | Nakamura et al. | 310/156.05 |
| 4,473,259 A | * | 9/1984 | Goldowsky | 310/90.5 |
| 4,607,181 A | * | 8/1986 | Smith | 310/87 |
| 4,775,812 A | * | 10/1988 | Kitamori | 310/112 |
| 4,783,609 A | | 11/1988 | Sugiyama et al. | |
| 4,806,813 A | * | 2/1989 | Sumi et al. | 310/156.05 |
| 5,204,572 A | * | 4/1993 | Ferreira | 310/156.19 |
| 5,220,232 A | * | 6/1993 | Rigney et al. | 310/156.25 |
| 5,237,229 A | * | 8/1993 | Ohishi | 310/156.12 |
| 5,325,006 A | * | 6/1994 | Uno et al. | 310/90 |
| 5,334,899 A | * | 8/1994 | Skybyk | 310/268 |
| 5,361,010 A | * | 11/1994 | Muller | 310/171 |
| 5,436,518 A | * | 7/1995 | Kawai | 310/156.18 |
| 5,440,185 A | * | 8/1995 | Allwine, Jr. | 310/114 |
| 5,490,319 A | * | 2/1996 | Nakamura et al. | 29/596 |
| 5,514,923 A | * | 5/1996 | Gossler et al. | 310/113 |

(List continued on next page.)

FOREIGN PATENT DOCUMENTS

| | | | | |
|---|---|---|---|---|
| DE | 1214770 | | 10/1962 | .......... H02P/21/39 |
| DE | 2605759 A | | 4/1975 | .......... H02K/29/02 |
| DE | 2654755 C | | 3/1976 | .......... H02K/39/00 |
| DE | 4309382 A1 | | 3/1993 | .......... H02K/29/06 |
| EP | 0 709 648 A2 | | 1/1996 | .......... G01B/7/00 |
| EP | 0 855 787 A2 | | 7/1998 | .......... H02K/23/66 |

Primary Examiner—Tran Nguyen
Assistant Examiner—Julio C. Gonzalez
(74) Attorney, Agent, or Firm—Mayer Brown Rowe & Maw LLP

(57) ABSTRACT

An electronically controlled electric motor has, as position sensors (6), coils (5) which are arranged in a stator (2) and opposite permanent magnets (4) of a rotor (3). The coils (5) are produced integrally with connecting leads (7). This allows the electric motor to be used in an environment with solvents. Furthermore, the electric motor is of a particularly inexpensive design.

14 Claims, 1 Drawing Sheet

U.S. PATENT DOCUMENTS

| | | | | |
|---|---|---|---|---|
| 5,537,033 | A | * | 7/1996 | Kelley .................. 324/207.24 |
| 5,625,239 | A | * | 4/1997 | Persson et al. ............. 310/171 |
| 5,684,352 | A | * | 11/1997 | Mita et al. ................. 310/156 |
| 5,736,800 | A | * | 4/1998 | Iannello et al. ........... 310/90.5 |
| 5,864,192 | A | * | 1/1999 | Nagate et al. ......... 310/156.05 |
| 5,912,519 | A | * | 6/1999 | Horner et al. ................ 134/1 |
| 6,029,336 | A | * | 2/2000 | Kliman et al. ............... 29/598 |
| 6,114,788 | A | * | 9/2000 | Vuillemin (Muller) et al. ...................... 310/156.35 |
| 6,144,131 | A | * | 11/2000 | Hollenbeck et al. ... 310/156.53 |
| 6,194,799 | B1 | * | 2/2001 | Miekka et al. .............. 310/198 |
| 6,323,572 | B1 | * | 11/2001 | Kinoshita ............. 310/156.07 |
| 6,369,478 | B1 | * | 4/2002 | Koharagi et al. ...... 310/156.23 |
| 6,392,370 | B1 | * | 5/2002 | Bedini ........................ 310/113 |
| 2001/0030471 | A1 | * | 10/2001 | Kanebako ................... 310/12 |

* cited by examiner

ELECTRONICALLY CONTROLLED ELECTRIC MOTOR PROVIDED FOR USE IN AN ENVIRONMENT CONTAINING SOLVENTS

BACKGROUND OF THE INVENTION

1. Field of the Invention

The invention relates to an electronically controlled electric motor intended for use in an environment with solvents, with at least one rotor bearing permanent magnets and a stator having coils, in which motor position sensors for ascertaining a commutating-time are arranged in the stator.

2. Description of the Related Art

Such electric motors are often referred to as electronically commutated DC motors and are used, for example, in fuel tanks for driving a fuel pump. If the coils are arranged in the stator, the electric motor does not require any carbon brushes for the transmission of electrical energy. The electric motor is consequently distinguished as an inexpensive drive with a long service life in the lower and medium power ranges. Hall sensors are generally used as position sensors. The Hall sensors have semiconductor chips with terminal contacts. The semiconductor chips and the terminal contacts are usually sheathed in plastic. The disadvantage of the known position sensors is that the semiconductor chips are of a very complex construction due to their sheathing. Furthermore, the semiconductor chips, soldering points of the terminal contacts are not solvent-resistant in the long term. Plastic sheathings also cannot offer adequate protection against the diffusion of solvents, so that, in spite of sheathing, the semiconductor chips are attacked by the solvents. These occurrences of damage to the semiconductor chips mean that the position of the rotor can no longer be reliably sensed by the position sensor.

SUMMARY OF THE INVENTION

The invention is based on the problem of designing an electric motor of the type stated at the beginning in such a way that it can be produced as inexpensively as possible and has a very high resistance to solvents.

This problem is solved according to the invention by the position sensors having an electrical conductor which is induced by a moving magnetic field to generate a signal and by the electrical conductor being produced integrally with connecting leads.

This design obviates the need for the position sensor of the electric motor according to the invention to have any sheathing, since an electrical conductor, such as a copper wire for example, is not attacked by solvents. As a result, particularly inexpensive position sensors can be used in the electric motor according to the invention. The integral production of the electrical conductor with the connecting leads also allows the position sensor to be fitted very easily and not to require any solvent-resistant soldering points. The electric motor according to the invention can consequently be produced particularly inexpensively and has a very high resistance to the solvents. A further advantage of this design is that the position sensor can be arranged very close to the magnet of the rotor, so that the position of the rotor can be determined particularly exactly.

The connecting leads of the position sensor could, for example, be screw-connected to continuing leads, to avoid soldering points which are not solvent-resistant. However, the fitting of the electric motor according to the invention is made even easier if the connecting leads of the position sensor are led to a solvent-free space. In the case of the electric motor intended for driving the fuel pump arranged in the fuel tank of a motor vehicle, the connecting leads can consequently be led to outside the fuel tank.

According to another advantageous development of the invention, the position of the rotor can be determined particularly exactly if the electrical conductor is designed as a coil. For this purpose, the coil may be arranged between the phase windings of the stator.

At particularly low rotational speeds of the rotor, the position of the rotor can be easily determined according to another advantageous development of the invention if the electrical conductor is designed as a pulse wire arranged transversely with respect to the movement of the magnet poles of the rotor.

For reasons of space, it is often not possible to arrange the position sensor within the coils of the stator. According to another advantageous development of the invention, the position sensor can be arranged at a position remote from the permanent magnets of the rotor if the rotor has position magnets arranged away from its, permanent magnets and opposite the position sensor. This also makes it possible to avoid a. falsification of the signals of the position sensor due to electric currents flowing in the coils of the stator. Furthermore, it is possible to arrange in the electric motor according to the invention more position magnets than the rotor has permanent magnets. This allows the position of the rotor to be determined particularly exactly.

In a further refinement, a disk which is subdivided into a plurality of regions, the regions being differently magnetized, is arranged instead of the position magnets.

BRIEF DESCRIPTION OF THE DRAWINGS

The invention allows numerous embodiments. To illustrate their basic principle further, four of these are described below and represented in the drawing, in which.

DETAILED DESCRIPTION OF THE PRESENTLY PREFERRED EMBODIMENTS

Figure 3:
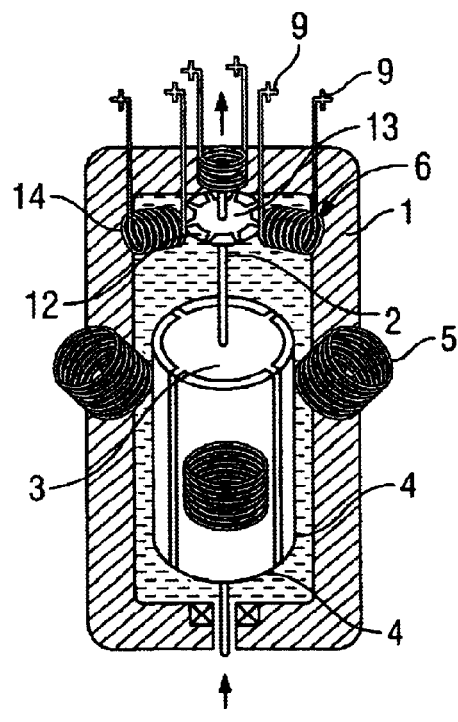

FIG. 3 schematically shows an electric motor with a housing 1 and a cylindrical rotor 3 arranged on a rotatably mounted shaft 2. The rotor 3 has a plurality of coils 5 opposite permanent magnets 4 of the rotor 3. The coils 5 are fastened in the housing 1. Position sensors 6 for sensing the position of the rotor 3 are arranged between the coils 5. On the basis of the signals of the position sensors 6, electric current fed to the coils 5 is controlled. The electric motor is often referred to as an electronically commutated DC motor. The position sensors 6 have in each case electrical conductors 8 produced integrally with connecting leads 7 led to outside the housing 1. On the outer side of the housing 1, the connecting leads 7 are connected to terminal contacts 9. At these terminal contacts 9, control electronics (not represented) of the electric motor can be connected. The electrical conductors 8 are wound to form a coil. When there is a rotation of the rotor 3, the permanent magnets 4 generate induction currents within the electrical conductors 8 wound to form the coil. The electrical conductors 9 are produced, for example, from copper wire.

Figure 1:
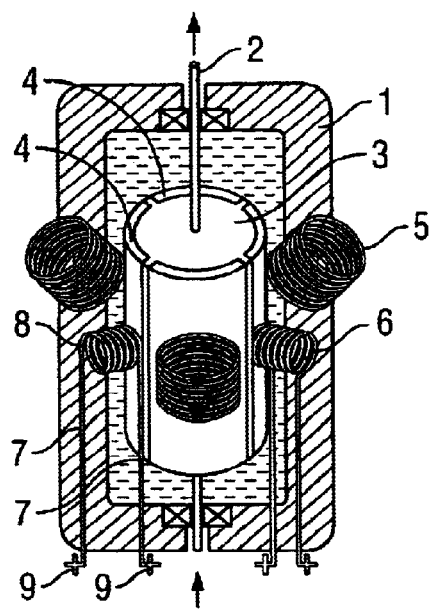
FIG. 1 shows a schematic representation of an electric motor according to the invention.
Figure 2:
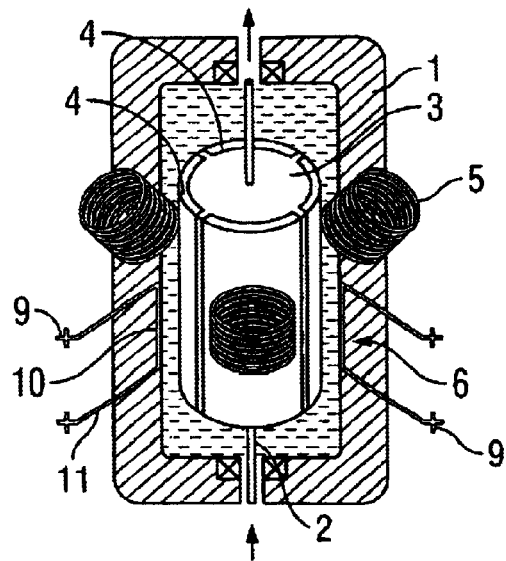
FIGS. 2 to 4 show further embodiments of the electric motor according to the invention in schematic representations.

FIG. 2 schematically shows a further embodiment of the electric motor, in which the position sensors 6 have electrical conductors 10 designed as pulse wires. The electrical conductors 10 are arranged parallel to the lateral surface of the rotor 3 and are produced integrally with connecting leads 11. As in the case of the electric motor from FIG. 1, the position sensors 6 are arranged between the coils 5.

FIG. 3 schematically shows a further embodiment of the electric motor, in which a disk 13 having position magnets 12 is fastened on the shaft 2 away from the permanent magnets 4 of the rotor 3. The position sensors 6 are opposite the disk 13 with the position magnets 12 and are consequently located in a position remote from the coils 5. The position sensors 6 have electrical conductors 14 wound to form a coil.

Figure 4:
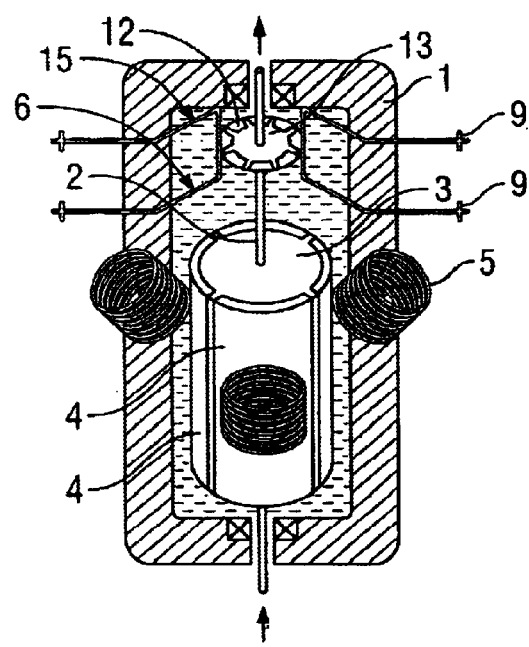

FIG. 4 schematically shows a further embodiment of the electric motor, in which the position sensors 6 of the disk 13 have electrical conductors 15 which are opposite with the position magnets 12 and are designed pulse wires.

In each of the depicted embodiments, the motor operates in the presence of a solvent 16 while the connecting leads 9 are led to a solvent-free space.

What is claimed is:

1. An electronically controlled electric motor comprising:
   a shaft;
   at least one rotor having permanent magnets thereon for rotation about the shaft;
   a stator housing having coils; and
   motor position sensors arranged in the stator housing, wherein at least one position sensor comprises a solvent resistant electrical conductor produced integrally with connecting leads;
   wherein a current is induced in the electrical conductor by a moving magnetic field; and
   wherein the rotor and position sensors operate in the presence of one or more solvents and the connecting leads of the positions sensors arm led to a space outside the presence of solvents.

2. The electric motor as claimed in claim 1, wherein the electrical conductor is a coil.

3. The electric motor as claimed in claim 1, wherein the electrical conductor is a wire arranged parallel to the shaft.

4. The electric motor as claimed in claim 1, further comprising position magnets comprising a second set of permanent magnets positioned on a disk, wherein the disk and position sensors are vertically displaced from the rotor and the disk is arranged for rotation about the shaft opposite the position sensors.

5. The electric motor as claimed in claim 1, wherein the moving magnetic field which induces the current in the electrical conductor is generated by the rotation of the permanent magnets on the rotor.

6. The electrical motor as claimed in claim 2, wherein the coil is coiled copper wire.

7. An electric motor for use in an environment containing solvents comprising:
   a stationary stator housing;
   a shaft through the stator housing;
   a rotor positioned inside the stator housing for rotation about the shaft, wherein the rotor contains one or more permanent magnets thereon;
   one or more electrical coils fixed in the stator housing;
   one or more position sensors fixed in the stator housing, wherein the position sensors comprise solvent resistant electrical conductors integral with connecting leads, and wherein current is induced in the electrical conductors by a moving magnetic field; and
   wherein the rotor and position sensors operate in the presence of one or more solvents and the connecting leads of the positions sensors are led to a space outside the presence of solvents.

8. The electrical motor as claimed in claim 7, wherein the electrical conductors are coils.

9. The electrical motor as claimed in claim 8, wherein the coils are coiled copper wires.

10. The electrical motor as claimed in claim 7, wherein the electrical conductors are pulse wires arranged parallel to the shaft.

11. The electrical motor as claimed in claim 7, further comprising a disk having permanent magnets thereon arranged for rotation about the shaft.

12. The electrical motor as claimed in claim 11, wherein the moving magnetic field which induces the current in the electrical conductor is generated by the rotation of the permanent magnets on the disk.

13. The electrical motor as claimed in claim 7, wherein the moving magnetic field which induces the current in the electrical conductor is generated by the rotation of the permanent magnets on the rotor.

14. The electrical motor as claimed in claim 10, wherein the pulse wires copper wires.

* * * * *